May 23, 1939.   C. E. K. MEES   2,159,038
PHOTOGRAPHIC EMULSION
Original Filed Jan. 16, 1937

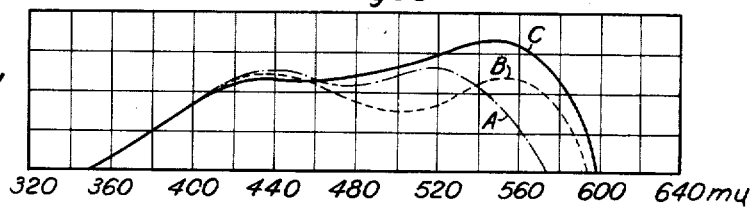

FIG.1

A = 2,3'-Diethyloxathiazolocarbocyanine Iodide.
B = 1,1'-Diethyl-2,2'-Cyanine Iodide.
C = Mixture of these dyes.

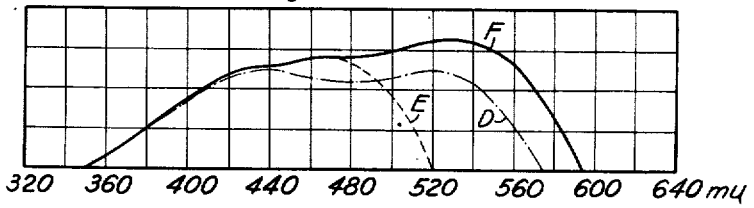

FIG.2

D = 2,3'-Diethyloxathiazolocarbocyanine Iodide.
E = 3,1'-Diethyl-4-Phenyloxazolo-2'-Cyanine Iodide.
F = Mixture of these dyes.

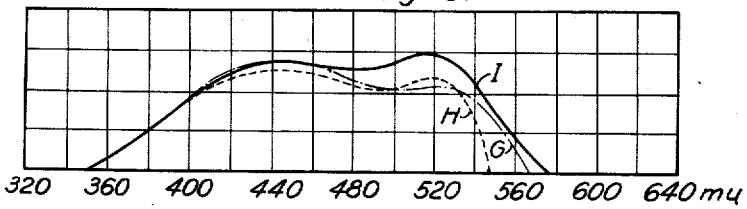

FIG.3

G = 2,3'-Diethyloxathiazolocarbocyanine Iodide.
H = 2,1'-Diethylthia-2'-Cyanine Iodide.
I = Mixture of these dyes.

Charles E. K. Mees
INVENTOR

Patented May 23, 1939

2,159,038

UNITED STATES PATENT OFFICE 2,159,038

PHOTOGRAPHIC EMULSION

Charles E. K. Mees, Rochester, N. Y., assignor to Eastman Kodak Company, Rochester, N. Y., a corporation of New Jersey Original application January 16, 1937, Serial No. 120,967. Divided and this application October 15, 1937, Serial No. 169,187

12 Claims. (Cl. 95—7)

This invention relates to sensitized photographic emulsions and more particularly to photographic emulsions, such as those of the gelatino-silver-halide type, containing a mixture or combination of two or more sensitizing materials, at least one of which cooperates with at least one other to alter the sensitivity of the emulsion to a greater degree than is possible with any one of the sensitizing materials alone. The sensitization produced by my combination is always greater, in some spectral region, than the sum total of the sensitizations produced by the separate sensitizing materials. The sensitizing materials of my combinations are substances generally referred to as dyes and more particularly as dyes of the cyanine class.

It is known in the art of making photographic emulsions that certain dyes of the cyanine class alter the sensitivity of photographic emulsions of the gelatino-silver-halide type, when incorporated therein. The sensitizing effect produced by the dye does not increase proportionally to the amount of dye, but passes through a maximum as the concentration is increased. Within the range of concentrations most useful in practice, the sensitivity increases much more slowly than the concentration of the dye. Likewise, the combined effect of two or more dyes on an emulsion is rarely equivalent to the sum of their separate effects; in general it is much less. Most commonly, the combined effect is no greater than the effect of a single one of the dyes employed in a concentration equal to the sum of the concentrations of all the dyes in the combination. Very frequently, the combined effect of two dyes is less than that of one of them alone.

I have found with certain combinations of two or more cyanine dyes, that the combined sensitization is substantially greater, in some spectral region, than that of any one of the dyes in the absence of the other or others. I will call this phenomenon supersensitization. In general, at least one dye of my combination may be said to be supersensitized by the other or others. The dye which is supersensitized may be called the basic sensitizer and the other dye the supersensitizer. However, the effect may be mutual and the dyes indistinguishable from the standpoint of which is supersensitized.

Supersensitization is a highly specific phenomenon and is found only in mixtures or combinations of dyes from certain specific groups. Supersensitization can be most readily observed, when a dye is supersensitized in a spectral region for which the other dye does not sensitize; for example, when the red sensitization produced by dye A increases in the presence of dye B which sensitizes only for the green. When two or more dyes sensitize for approximately the same or widely overlapping spectral regions (as in a number of the cases to be described in the instant application), supersensitization can still be detected, because if supersensitization obtains in such cases the total optical sensitization produced by a combination of two or more dyes will always be greater, under favorable conditions, than that which can be produced by any dye of the combination alone at any concentration. The magnitude of the supersensitization depends upon the relative and absolute concentrations of the dyes in the emulsion and on the type of emulsion. By suitable choice of conditions supersensitization can always be made to assume values which are readily observable.

In my copending application Serial No. 641,177, filed November 4, 1932, now United States Patent No. 2,075,046, dated March 30, 1937, I have described emulsions containing supersensitizing combinations of pinacyanol with dialkylaminostyryl derivatives of alkyl quaternary salts of simple nitrogen-containing heterocyclic bases; in my copending application Serial No. 641,178, filed November 4, 1932, now United States Patent No. 2,075,047, dated March 30, 1937, are described emulsions containing supersensitizing combinations of sulfur or selenium-containing pseudocyanine dyes with styryl derivatives of alkyl quaternary salts of simple nitrogen heterocyclic bases; and in my copending application Serial No. 641,179, filed November 4, 1932, now United States Patent No. 2,075,048, dated March 30, 1937, are described emulsions containing supersensitizing combinations of sulfur or selenium-containing carbocyanine dyes with 2,2'-dialkyl-8-alkyl-3,4,3',4'-dibenzothiacarbocyanine dyes.

In my instant application, emulsions containing supersensitizing mixtures or combinations of one or more sensitizing dyes of the group of oxathiazolocarbocyanine dyes devoid of substituents in the 4'-and-5'-positions and oxathiazolocarbocyanine dyes having an aryl group substituent in at least one of the 4'-and 5'-positions with one or more sensitizing dyes of the pseudocayanine group will be described. Just how the dyes of my mixtures cooperate to give a supersensitizing effect is not known. I shall refer to the mixtures as combinations, although I do not intended to imply that the dyes are chemically combined.

An object of my invention, therefore, is to provide photographic emulsions containing a supersensitizing combination of cyanine dyes. A further object is to provide a process for sensitizing photographic emulsions with supersensitizing combinations of cyanine dyes and to provide a method of increasing the sensitivity of photographic emulsions sensitized with cyanine dyes. A still further object is to provide a photographic element comprising a support coated with such supersensitized emulsions. Other more specific objects will become apparent upon a complete perusal of these specifications.

The dyes which I employ in my supersensitizing mixtures are sensitizers of photographic emulsions when used alone. While there is more than one manner of formulating and naming the dyes which I employ in practicing my invention, it is believed that the formulas, systems of numbering and names used herein are in accordance with those used during the development of the cyanine dye art to its present stage. The most probable formulae of representative dye-types are given below, in order to clearly set forth the nature of the materials employed in my supersensitizing mixtures. These formulas should not be construed as limiting my invention, except as indicated in the appended claims.

Among the oxathiazolocarbocyanine dyes useful in practicing my invention are the following:

The oxathiazolocarbocyanines, which can be represented by the following general formula:

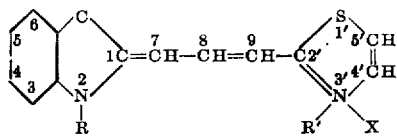

The 4'-phenyloxathiazolocarbocyanines, which can be represented by the following general formula:

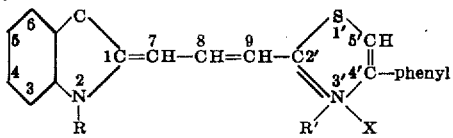

In all of the above formulas, R and R' represent alkyl groups and X represents an acid radical. The benzoxazole nucleus can be substituted with simple substituents which do not interfere with sensitizing properties, such for example as chloro, alkyl or alkoxy.

In practicing my invention, I have found it convenient to employ the dye-iodides (where X represents iodine). However, other dye-salts can be employed, such for example as the chlorides, bromides, perchlorates, alkylsulfates or alkyl-p-toluenesulfonates. I have found it advantageous to employ the dyes, wherein R and R' represent alkyl groups of at least two carbon atoms. The dyes wherein R and R' represent ethyl are especially useful.

Oxathiazolocarbocyanine dyes can be prepared by reacting a 2-methylthiazole base with an equimolecular proportion of an alkyl-p-toluenesulfonate, e. g., ethyl-p-toluenesulfonate, by heating for several hours (advantageously 4 or 5 days) at about 95° to 100° C. The crude so-prepared quaternary salt is then reacted with a 1-(β-acetanilidovinyl)-benzoxazole alkyl quaternary salt, e. g., ethiodide, by refluxing in dry pyridine for about 10 minutes or longer. The crude quaternary salt is advantageously employed in an excess of about 20%. The quantity of pyridine is conveniently about 10 cc. for each gram of 2-methylthiazole base used. The pyridine reaction mixture is concentrated by removing a portion of the pyridine under vacuum. About two liters of diethyl ether is then added to the residuum to form a solution from which the dye separates upon chilling after standing. The dye can be recrystallized from methyl alcohol after washing with a little water and acetone.

Among the pseudocyanine dyes, which I employ in practicing my invention, are the following:

The 2,2'-cyanine dyes, which can be represented by the following general formula:

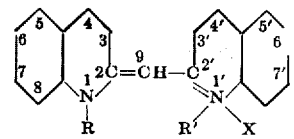

The thia-2'-cyanine dyes, which can be represented by the following general formula:

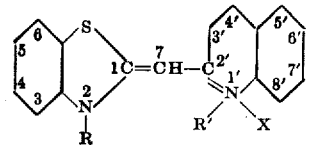

The selena-2'-cyanine dyes, which can be represented by the following general formula:

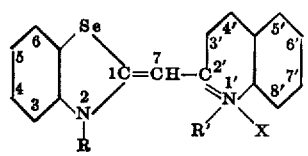

The benzothia-2'-cyanine dyes, which can be represented by the following general formula:

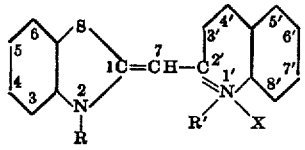

The oxazolo-2'-cyanine dyes, which can be represented by the following general formula:

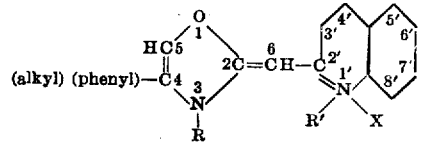

The thiazolo-2'-cyanine dyes, which can be represented by the following general formula:

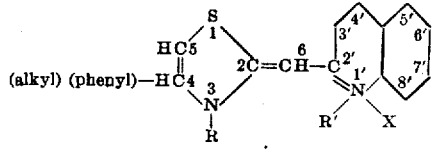

In all of the above formulas of pseudocyanine dyes, R and R' represent alkyl groups and X represents an acid radical. In practicing my invention, I have found it convenient to employ the pseudocyanine dye-iodides (wherein X represents iodine). However, other pseudocyanine salts can be employed, such for example as the chlorides, bromides, perchlorates, alkylsulfates or alkyl-p-toluene-sulfonates. I have further found it advantageous to employ pseudocyanine dyes wherein R and R' represent an alkyl group of from one to four atoms. The dyes wherein R and R' represent ethyl are particularly useful in practicing my invention. The pseudocyanine dyes can be substituted in their nuclei with simple substituents which do not interfere with sensitizing properties, such for example as alkyl, chloro, alkoxy or amino groups. The oxazolo-2'-cyanines and thiazolo-2'-cyanines can be substituted in the five position with substituents such as alkyl groups or aryl groups of the benzene series, for example phenyl. The selenazolo-2'-cyanine dye can also be employed in my supersensitizing combination, though less advantageously.

Brooker and Keyes in the Journal of the American Chemical Society, vol. 57, pages 2488–2491 (1935) review the literature pertaining to pseudocyanine dyes and describe a method for the preparation thereof. Oxazolo-, thiazolo- and selenazolo-2'-cyanine dyes are described in U. S. Patent No. 1,969,446, dated August 7, 1934.

By way of illustration, I have found the following combinations of dyes to exhibit supersensitizing effects. These illustrations are not intended to limit my invention.

I. 2,3'-diethyloxathiazolocarbocyanine salts, as exemplified by the dye-iodide, with one or more of the following:

1,1'-diethyl-2,2'-cyanine iodide.
2,1'-diethyl-3,4-benzothia-2'-cyanine bromide.
2,1'-diethylthia-2'-cyanine iodide.
2,1'-diethyl-2-chlorothia-2'-cyanine iodide.
3,1'-diethyl-4-phenyloxazolo-2'-cyanine iodide.
3,1'-diethyl-4-phenylthiazolo-2-cyanine iodide.
2,1'-diethyl-6'-methyl-3,4-benzathia-2'-cyanine iodide.

II. 2,3'-diethyl-4'-phenyloxathiazolocarbocyanine salts, as exemplified by the dye-iodide, with one or more of the following:

2,1'-diethylthia-2'-cyanine iodide.
2,1'-diethyl-3,4-benzothia-2'-cyanine bromide.
2,1'-diethyl-4-chlorothia-2'-cyanine iodide.
1,1'-diethyl-2,2'-cyanine iodide.

The oxathiazolocarbocyanines can be substituted in the trimethenyl chain with alkyl groups, such as in the case of 2,3'-diethyl-4'-phenyl-9-methyloxathiazolocarbocyanine salts, without departing from the scope of my invention. Those oxathiazolocarbocyanines containing methyl groups on the nitrogen atoms, such as in the case of 2-ethyl-3'-methyloxathiazolocarbocyanine salts, are generally less satisfactory in practicing my invention. Those oxathiazolo- and carbocyanine dyes containing an aryl group, in the thiazole nucleus are, likewise, less satisfactory in practicing my invention. However, the objectives of my invention can be attained as illustrated under II above by combining 4'-phenyl dyes with 2,2'-cyanine dyes, or sulfur-containing pseudocyanine dyes.

Pseudocyanine dyes containing the 5,6-benzothia nucleus are usually of lesser utility in practicing my invention. Among the oxazolo-, thizolo- and selenazolo-2'-cyanines, those substituted in the four position of the oxazole, thiazole or selenazole nucleus by an alkyl group, such as methyl, or by an aryl group, such as phenyl for example, are especially useful in practicing my invention.

In general, it can be said of my combinations that the pseudocyanine is the dye supersensitized (basic sensitizer) and the oxathiazolocarbocyanine is the supersensitizer. In the combinations of 3,1'-diethyl-4-phenyloxazolo-2'-cyanine with the oxathiazolocarbocyanines, it is apparently the former, which is the supersensitizer. However, the nature of this relationship between the dyes of my combination is frequently difficult to determine and is, in fact, immaterial to the practice of my invention.

While I have illustrated only combinations containing two dyes, my combinations can as well contain one oxathiazolocarbocyanine cooperating with two or more pseudocyanine dyes. Likewise, my combinations can contain one pseudocyanine dye cooperating with two or more oxathiazolocarbocyanine dyes.

The objects of my invention can be accomplished by merely incorporating the appropriate dyes in an ordinary photographic emulsion of ordinary concentration. My invention is particularly directed to the ordinarily employed gelatino-silver-halide emulsions. However, my supersensitizing combinations can be employed in emulsions in which the carrier is other than gelatin, for example, a resinous substance or cellulosic derivative which has substantially no deleterious effect on the light sensitive materials. As silver halide emulsions, I include such emulsions as are commonly employed in the art, for example, silver chloride or silver bromide emulsions which can contain other salts which may be light sensitive. By way of illustration, the hereindescribed supersensitized emulsions were prepared employing an ordinary gelatino-silver-bromide emulsion of ordinary concentration (approximately 40 g. of silver halide per liter). The dyes were generally employed in concentrations of the order of 10 mgs. each per liter of ordinary emulsion, but can be employed in concentrations several times greater or less than that. The ratio of concentration of the oxathiazolocarbocyanine dye to the concentration of pseudocyanine dye may be varied widely from 10:1 to 1:10, for example. The most favorable conditions for supersensitization of the desired magnitude must be determined by experiment, the manner of which will be apparent to those skilled in the art, upon a complete perusal of these specifications.

The method of incorporating dyes in emulsions are simple and well known to those skilled in the art. In practicing my invention, the dyes of my combinations can be added separately or together. It is convenient to add the dyes separately in the form of their solutions in appropriate solvents. The solvent must, of course, be compatible with the emulsions, substantially free from any deleterious effect on the light sensitive materials and capable of dissolving the dyes. Methanol has proven satisfactory as a solvent for the dyes in practicing my invention. The dyes are advantageously incorporated in the finished, washed emulsion and should be uniformly distributed throughout the emulsion. The emulsion can then be converted into a photographic element by coating upon a support, such as glass, cellulose acetate, cellulose nitrate, other cellulose derivative or resin, in a manner well known in the art.

The accompanying drawing is by way of illustration and depicts the supersensitizing effect of eight of my new combinations. Each figure of the drawing is a diagrammatic reproduction of three spectrograms showing first the sensitivity of a silver bromide emulsion containing an oxathiazolocarbocyanine dye (represented by the dot and dash curve), second the sensitivity of the same silver bromide emulsion containing a pseudocyanine dye (represented by the dotted curve), and third the sensitivity of the same silver bromide emulsion containing a mixture or combination of the said carbocyanine and the said pseudocyanine (represented by the solid curve). The supersensitizing effect is apparent from the drawing.

More specifically, in Fig. 1, curve A represents the sensitivity of an ordinary gelatino-silver-bromide emulsion containing 2,3'-diethyloxathiazolocarbocyanine iodide in a concentration of about 10 mg. per liter of emulsion, curve B represents the sensitivity of the same emulsion containing 1,1'-diethyl-2,2'-cyanine iodide in a concentration of about 20 mg. per liter of emulsion and curve C represents the sensitivity of the same emulsion containing 2,3'-diethyloxathiazolocarbocyanine iodide and 1,1'-diethyl-2,2'-cyanine iodide in concentrations of 10 mg. and 20 mg. per liter emulsion, respectively. The sensitivity of the emulsion represented by curve C, as measured through a minus blue Wratten No. 12 filter, is about six times that of the emulsion represented by curve A.

In Fig. 2, curve D represents the sensitivity of a silver bromide emulsion containing 2,3'-diethyloxathiazolocarbocyanine iodide in a concentration of about 10 mg. per liter, curve E represents the same emulsion containing 3,1'-diethyl-4-phenyloxazolo-2' cyanine iodide in a concentration of about 20 mg. per liter of emulsion and curve F represents the sensitivity of the same emulsion containing 2,3'-diethyloxathiazolocarbocyanine iodide and 3,1'-diethyl-4-phenyloxazolo-2'-cyanine iodide in concentrations of 10 mg. and 20 mg. per liter of emulsion, respectively. The sensitivity of the emulsion represented by curve F, as measured through a minus blue Wratten No. 12 filter, is about five times that of the emulsion represented by curve D.

In Fig. 3, curve G represents the sensitivity of a silver bromide emulsion containing 2,3'-diethyloxathiazolocarbocyanine iodide in a concentration of about 3 mg. per liter of emulsion, curve H represents the same emulsion containing 2,1'-diethyl-thia-2'-cyanine iodide in a concentration of about 10 mg. per liter of emulsion and curve I represents the sensitivity of the same emulsion containing 2,3'-diethyloxathiazolocarbocyanine iodide and 2,1'-diethyl-thia-2'-cyanine iodide in concentration of about 3 mg. and 10 mg. per liter of emulsion, respectively. The sensitivity of the emulsion represented by curve I, as measured through a minus blue Wratten No. 12 filter, is over three times that of the emulsion represented by curve G.

The spectrograms corresponding to the figures of the accompanying drawing were made in a wedge spectrograph. The intensity of each horizontal line was approximately $\frac{1}{10}$ that at the next lower line. Where the spectrograms were compared, as in each of the figures of the drawing, the exposures were for the same time and test plates of each groups were developed together.

Still further examples showing the applications of my invention could be cited, but the foregoing will be sufficient to teach those skilled in the art the manner in which my invention is carried out and the principles of sensitizing photographic emulsions with supersensitizing combinations such as described herein.

This application is a division of my copending application Serial No. 120,967, filed January 16, 1937.

What I claim as my invention and desire to secure by Letters Patent of the United States is:

1. A photographic silver halide emulsion containing a supersensitizing combination of at least one sensitizing dye selected from the group consisting of oxathiazolocarbocyanine dyes devoid of substituents in the 4'- and 5'-positions and oxathiazolocarbocyanine dyes having an aryl group in at least one of the 4'- and 5'-positions with at least one sensitizing pseudocyanine dye.

2. A photographic gelatino-silver-halide emulsion containing a supersensitizing combination of at least one sensitizing dye selected from the group consisting of oxathiazolocarbocyanine dyes devoid of substituents in the 4'- and 5'-positions and oxathiazolocarbocyanine dyes having an aryl group in at least one of the 4'- and 5'-positions with at least one sensitizing pseudocyanine dye.

3. A photographic gelatino-silver-halide emulsion containing a supersensitizing combination of at least one sensitizing oxathiazolocarbocyanine dye devoid of substituents in the 4'- and 5'-positions with at least one sensitizing pseudocyanine dye.

4. A photographic gelatino-silver-halide emulsion containing a supersensitizing combination of at least one sensitizing 2,3'-dialkyloxathiazolocarbocyanine dye devoid of substituents in the 4'- and 5'-positions with at least one sensitizing 1,1'-dialkyl-2,2'-cyanine dye.

5. A photographic gelatino-silver-halide emulsion containing a supersensitizing combination of at least one sensitizing 2,3'-dialkyloxathiazolocarbocyanine dye, devoid of substituents in the 4'- and 5'-positions and in which the 2- and 3'-alkyl groups each contain at least two carbon atoms, with at least one sensitizing 1,1'-dialkyl-2,2'-cyanine dye in which the 1- and 1'-alkyl groups each contain from 1 to 4 carbon atoms.

6. A photographic gelatino-silver-halide emulsion containing a supersensitizing combination of at least one sensitizing 2,3'-diethyloxathiazolocarbocyanine dye devoid of substituents in the 4'- and 5'-positions with at least one sensitizing 1,1'-diethyl-2,2'-cyanine dye.

7. A photographic gelatino-silver-halide emulsion containing a supersensitizing combination of at least one sensitizing 2,3'-dialkyloxathiazolocarbocyanine dye devoid of substituents in the 4'- and 5'-positions with at least one sensitizing 1',2-dialkylthia-2'-cyanine dye.

8. A photographic gelatino-silver-halide emulsion containing a supersensitizing combination of at least one sensitizing 2,3'-dialkyloxathiazolocarbocyanine dye, devoid of substituents in the 4'- and 5'-positions and in which the 2- and 3'-alkyl groups each contain at least two carbon atoms, with at least one sensitizing 1',2-dialkylthia-2'-cyanine dye in which the 1'- and 2'-alkyl groups each contain from 1 to 4 carbon atoms.

9. A photographic gelatino-silver-halide emulsion containing a supersensitizing combination of at least one sensitizing 2,3'-diethyloxathiazolocyanine dye devoid of substituents in the 4'- and 5'-positions with at least one sensitizing 1',2-diethylthia-2'-cyanine dye.

10. A photographic gelatino-silver-halide emulsion containing a supersensitizing combination of at least one sensitizing 2,3'-dialkyloxathiazolocarbocyanine dye devoid of substituents in the 4'- and 5'-positions with at least one sensitizing 1',3-dialkyl-4'-phenyloxazolo-2'-cyanine dye.

11. A photographic gelatino-silver-halide emulsion containing a supersensitizing combination of at least one sensitizing 2,3'-dialkyloxathiazolocarbocyanine dye, devoid of substituents in the 4'- and 5'-positions and in which the 2- and 3'-alkyl groups each contain at least two carbon atoms, with at least one sensitizing 1',3-dialkyl-4'-phenyloxazolo-2'-cyanine dye in which the 1'- and 3-alkyl groups each contain from 1 to 4 carbon atoms.

12. A photographic gelatino-silver-halide emulsion containing a supersensitizing combination of at least one sensitizing 2,3'-diethyloxathiazolocarbocyanine dye devoid of substituents in the 4'- and 5'-positions with at least one sensitizing 1',3-diethyl-4'-phenyloxazolo-2'-cyanine dye.

CHARLES E. K. MEES.

Certificate of Correction

Patent No. 2,159,038.   May 23, 1939.

CHARLES E. K. MEES

It is hereby certified that errors appear in the printed specification of the above numbered patent requiring correction as follows: Page 2, first column, lines 31 to 36, inclusive, strike out the formula and insert instead the following—

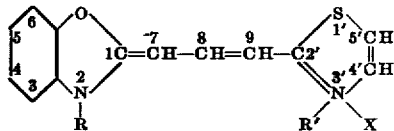

lines 40 to 45, inclusive, strike out the formula and insert instead the following—

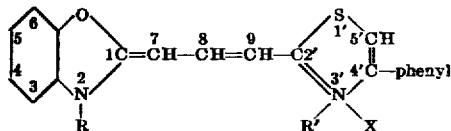

page 3, first column, line 1, after the word "four" insert *carbon*; and that the said Letters Patent should be read with these corrections therein that the same may conform to the record of the case in the Patent Office.

Signed and sealed this 19th day of September, A. D. 1939.

[SEAL]

HENRY VAN ARSDALE,
*Acting Commissioner of Patents.*

4'- and 5'-positions with at least one sensitizing 1',3-dialkyl-4'-phenyloxazolo-2'-cyanine dye.

11. A photographic gelatino-silver-halide emulsion containing a supersensitizing combination of at least one sensitizing 2,3'-dialkyloxathiazolocarbocyanine dye, devoid of substituents in the 4'- and 5'-positions and in which the 2- and 3'-alkyl groups each contain at least two carbon atoms, with at least one sensitizing 1',3-dialkyl-4'-phenyloxazolo-2'-cyanine dye in which the 1'- and 3-alkyl groups each contain from 1 to 4 carbon atoms.

12. A photographic gelatino-silver-halide emulsion containing a supersensitizing combination of at least one sensitizing 2,3'-diethyloxathiazolocarbocyanine dye devoid of substituents in the 4'- and 5'-positions with at least one sensitizing 1',3-diethyl-4'-phenyloxazolo-2'-cyanine dye.

CHARLES E. K. MEES.

Certificate of Correction

Patent No. 2,159,038.      May 23, 1939.

CHARLES E. K. MEES

It is hereby certified that errors appear in the printed specification of the above numbered patent requiring correction as follows: Page 2, first column, lines 31 to 36, inclusive, strike out the formula and insert instead the following—

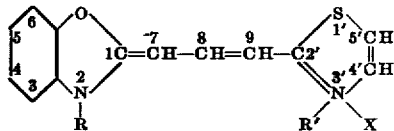

lines 40 to 45, inclusive, strike out the formula and insert instead the following—

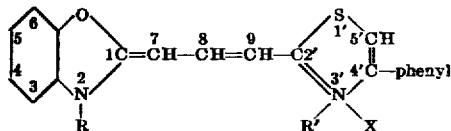

page 3, first column, line 1, after the word "four" insert *carbon*; and that the said Letters Patent should be read with these corrections therein that the same may conform to the record of the case in the Patent Office.

Signed and sealed this 19th day of September, A. D. 1939.

[SEAL]

HENRY VAN ARSDALE,
*Acting Commissioner of Patents.*